(12) United States Patent
Lilja et al.

(10) Patent No.: US 9,352,290 B2
(45) Date of Patent: May 31, 2016

(54) DEVICE AND METHOD FOR DISPERSING TWO SOLUTIONS IN EACH OTHER IN SOLVENT EXTRACTION

(75) Inventors: Launo Lilja, Pori (FI); Stig-Erik Hultholm, Pori (FI); Eero Ekman, Pori (FI); Bror Nyman, Vanha-Ulvila (FI)

(73) Assignee: Outotec Oyj, Espoo (FI)

( * ) Notice: Subject to any disclaimer, the term of this patent is extended or adjusted under 35 U.S.C. 154(b) by 352 days.

(21) Appl. No.: 13/822,205

(22) PCT Filed: Sep. 15, 2011

(86) PCT No.: PCT/FI2011/050794
§ 371 (c)(1),
(2), (4) Date: Mar. 11, 2013

(87) PCT Pub. No.: WO2012/035207
PCT Pub. Date: Mar. 22, 2012

(65) Prior Publication Data
US 2013/0176815 A1  Jul. 11, 2013

(30) Foreign Application Priority Data
Sep. 16, 2010  (FI) .................................. 201 0031 7

(51) Int. Cl.
| | | |
|---|---|---|
| *B01F 7/24* | (2006.01) | |
| *B01D 11/04* | (2006.01) | |
| *B01F 7/00* | (2006.01) | |
| *B01F 7/16* | (2006.01) | |
| *C22B 3/26* | (2006.01) | |

(52) U.S. Cl.
CPC .............. *B01F 7/24* (2013.01); *B01D 11/0457* (2013.01); *B01F 7/00441* (2013.01); *B01F 7/1675* (2013.01); *C22B 3/0005* (2013.01); *B01F 2215/0431* (2013.01); *Y02P 10/234* (2015.11)

(58) Field of Classification Search
CPC ........................................................ B01F 7/24
USPC .................................................. 366/310, 320
See application file for complete search history.

(56) References Cited

U.S. PATENT DOCUMENTS 116,855 A *  7/1871  Monfort .......................... 366/296
2,521,398 A *  9/1950  North ................................ 99/466

(Continued)

FOREIGN PATENT DOCUMENTS

| CN | 101385951 B | 6/2010 |
| EP | 0542713 A1 | 11/1992 |

OTHER PUBLICATIONS

Finnish Search Report for FI20100317 dated Jul. 21, 2011, 1 page.

(Continued)

*Primary Examiner* — David Sorkin
(74) *Attorney, Agent, or Firm* — Chernoff, Vilhauer, McClung & Stenzel, LLP

(57) ABSTRACT

The invention relates to a mixing device and method by means of which two solutions that are insoluble or poorly soluble in each other are mixed together into a dispersion. The device consists of at least three helical bars rotating upwards around a shaft and supported on it, so that the support structures between the shaft and the helical rods are set essentially in a horizontal position. The device and method are particularly suitable for mixing solvent extraction solutions used in the hydrometallurgical recovery of metals to form a dispersion.

16 Claims, 8 Drawing Sheets

(56) References Cited

U.S. PATENT DOCUMENTS

Figure 1B:
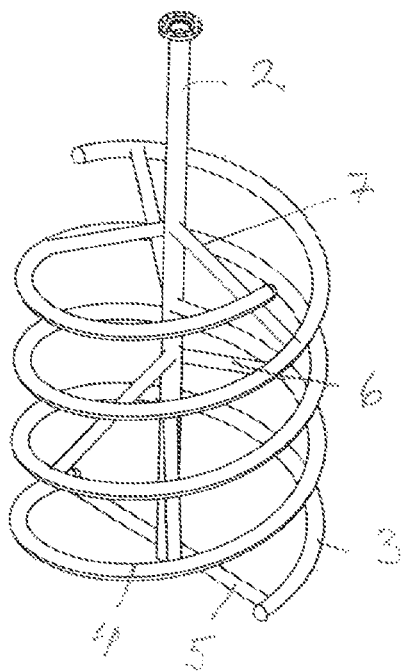

| | | | |
|---|---|---|---|
| 2,809,815 A * | 10/1957 | Born | 366/310 |
| 2,810,557 A * | 10/1957 | Phelan | 366/311 |
| 3,365,177 A | 1/1968 | Daman | |
| 5,185,081 A | 2/1993 | Nyman | |
| 2004/0057338 A1 * | 3/2004 | Pecis | 366/295 |

OTHER PUBLICATIONS

Written Opinion of the International Searching Authority for PCT/FI2011/050794 dated Jan. 25, 2012, 5 pages.

* cited by examiner

PRIOR ART

DEVICE AND METHOD FOR DISPERSING TWO SOLUTIONS IN EACH OTHER IN SOLVENT EXTRACTION

CROSS-REFERENCE TO RELATED APPLICATION

This is a national stage application filed under 35 USC 371 based on International Application No. PCT/FI2011/050794 filed Sep. 15, 2011, and claims priority under 35 USC 119 of Finnish Patent Application No. 20100317 filed Sep. 16, 2010.

FIELD OF THE INVENTION

The invention relates to a device and method enabling two solutions that are mutually insoluble or poorly soluble to be mixed together into a dispersion. The mixing device consists of at least three helical bars rotating around and supported on a shaft, so that the support structures between the shaft and helical bars are set essentially in a horizontal position. The device and method are particularly suitable for mixing the solvent extraction solutions used in the hydrometallurgical recovery of metals to form a dispersion.

BACKGROUND OF THE INVENTION

In the solvent extraction method used in the hydrometallurgical recovery of metals, two mutually insoluble or poorly soluble solutions are first mixed together in a mixing stage to form a dispersion. After this the dispersion is routed to a settling section, in which the dispersion generally flows horizontally and the purpose is to separate the dispersion again into two pure layers one on top of the other. In the actual extraction stage the aqueous solution contains one or several valuable metals and impurities, and the purpose is to achieve mass transfer during the extraction stage, in other words to transfer one or more of the desired valuable metals into the organic extraction solution, leaving the impurities in the aqueous solution. In the stripping stage the organic extraction solution is contacted with another aqueous solution and the purpose is to obtain the reverse mass transfer, i.e. to transfer one or more valuable metals from the organic extraction solution into the aqueous solution, which is subsequently usually routed to metal recovery by electrowinning.

In order to mix an aqueous solution and an organic extraction solution into each other in the mixing section of an extraction cell, a radial turbine is often used. Another mixer type for the extraction cell mixing space known in the prior art is a mixer consisting of tubular coils and their support arms, which is described for example in U.S. Pat. No. 5,185,081. This mixer is made up of two tubular coils rising upward and the support arms attaching the coils to the mixer shaft. The tubular coils make about two rotations around the shaft. On the basis of the drawings in the publication, it can be deduced that the pitch angle of the coils is in the region of 10 degrees. Straight support rods are an essential part of the mixer. The lower support rods are horizontal, the central rods are inclined upwards towards the shaft at an angle of about 30° and the topmost rods are inclined downwards towards the shaft at an angle of 30°. The mixer may also consist of two pairs of spiral tubes side by side.

A vertical rotation is obtained in the solution by means of the mixer in question and the support rods, particularly the topmost support rods, bring about radial mixing in the solution. The mixer also includes in its upper section a flow reverser placed around the shaft, and this enables the direction of the solution to be diverted downwards in the central part of the mixing space. It is also typical of the mixer that its diameter is 0.5-0.75 times the diameter of the mixing space and the height 0.6-0.9 times the effective height of the mixing space. The mixer is of the up-pumping type. In this way an ascending flow is formed in the mixing space on the periphery, which is turned downwards in the upper part of the space by means of the mixer towards the bottom part of the mixing space. Using and sustaining the vertical circulation evens out the mixing intensity of the mixing space. The mixer support rods bring about a droplet size distribution, especially in the upper section of the mixing space, that is not the most advantageous for forming a dispersion in solution extraction, even though it is considerably better than that obtained with a turbine or blade mixer.

PURPOSE OF THE INVENTION

An essential part of the spiral mixer known in the prior art is the support rods, which achieve radial mixing of the solution. In addition to a vertical circulation, the radial and highly turbulent mixing that occurs demands its own power, so the power number of the mixer has not been ideal. The purpose of this invention is to present a device and method for mixing into a dispersion two liquids that are poorly soluble in each other in solvent extraction connected to the hydrometallurgical recovery of metals, and the fact that it has been possible to intensify the vertical circulation flow in the mixer space by means of said device and method in comparison with the mixer accordant with the prior art.

SUMMARY OF THE INVENTION

The invention relates to a mixing device used in the hydrometallurgical recovery of metals to mix two solvent extraction solutions together in the mixing space or mixer of an extraction cell. The mixing device consists of at least three helical bars supported on the lower section of the shaft and rising upwards from the lower section, whereby the helical rods are fixed to the shaft by support rings set horizontally and horizontal curved support spokes.

According to one embodiment of the device, the pitch angle of the helical rods is 10-30° to the horizontal. The helical bars rise around the shaft in preferably 1.2-3 rotations. The cross-section of the helical bars, support rings and support spokes is basically circular.

According to one embodiment of the device, there is a fixed join between the outer surface of the support rings and the inner surface of the helical bars.

According to one embodiment of the device, the support spokes are attached to the shaft at one end and to a support ring at the other end. The number of support rings is 3-6, so that the bottom end of the helical bars is supported on the lower support ring and the top end of the helical bar on the upper support ring. The number of the support rings is 1-4 in the middle section of the mixing device and their location in terms of elevation can be changed.

According to one embodiment of the device, the ratio of the diameter of the mixing device to the diameter of the mixing space is in the region of 0.7-0.77. The ratio of the height of the mixing device to its diameter is preferably around 1.2-4.

According to one embodiment of the device, the diameter of the helical bars is 0.03-0.07 times the diameter of the mixing device.

According to one embodiment of the device, the support spokes are attached to the shaft directly or by means of the shaft support structure. The support structure of the shaft is made up of a cylindrical section, to which the support spokes are fixed, a bottom cone attached to the underneath of the cylindrical part, and an upper cone attached to the upper side. One end of each support spoke is attached to the shaft or its support structure at an angle of 30-60° and the other end is attached to the support ring at an angle of 15-30°.

According to one embodiment of the device, the direction of curvature of the support spokes of the upper support ring is set counter to the direction of rotation of the mixing device.

According to one application of the device, the direction of curvature of at least the support spokes of the lower support ring is set to accord with the direction of rotation of the mixing device.

According to one embodiment of the device, the direction of curvature of the support spokes of the central section support rings of the mixing device is set to accord with the direction of rotation of the mixing device.

The invention also relates to a method for mixing two solvent extraction solutions used in the hydrometallurgical recovery of metals in the mixing space of an extraction cell, whereby the organic extraction solution and aqueous solution are mixed into each other by means of a mixing device consisting of at least three helical bars placed around the shaft and supported on the shaft. The mixing device brings about a vertical circulation, in which an ascending vertical flow is formed from the periphery of the mixing space and a downward-directed flow is formed in the space inside the mixing device diameter and where the radial flows are minimised by positioning all the support members between the helical bars and the shaft horizontally.

According to one embodiment of the method, the solutions are mixed together in a mixing space, where the ratio of the height of the mixing space to the diameter is 1.2-4.

According to one application of the method, the flow rate of the vertical circulation is about half the flow rate of the mixing device, i.e. in the region of 0.7-1.7 m/s.

According to one embodiment of the method, the support members between the helical bars and the shaft consist of support rings and support spokes, whereby the number of support rings is 3-6 comprising a lower support ring, upper support ring and at least one central section support ring, the position of which in terms of elevation can be changed.

According to one embodiment of the method, a dispersion is formed in which the organic extraction solution is continuous, whereby the support ring of the central section of the mixing device is set higher than the central section of the mixing device in terms of elevation.

According to another embodiment of the method, a dispersion is formed in which the aqueous solution is continuous when the O/A ratio is over 1, whereby the support ring of the central section of the mixing device is set lower than the central section in terms of the elevation of the mixing device.

LIST OF DRAWINGS

Figure 1A:
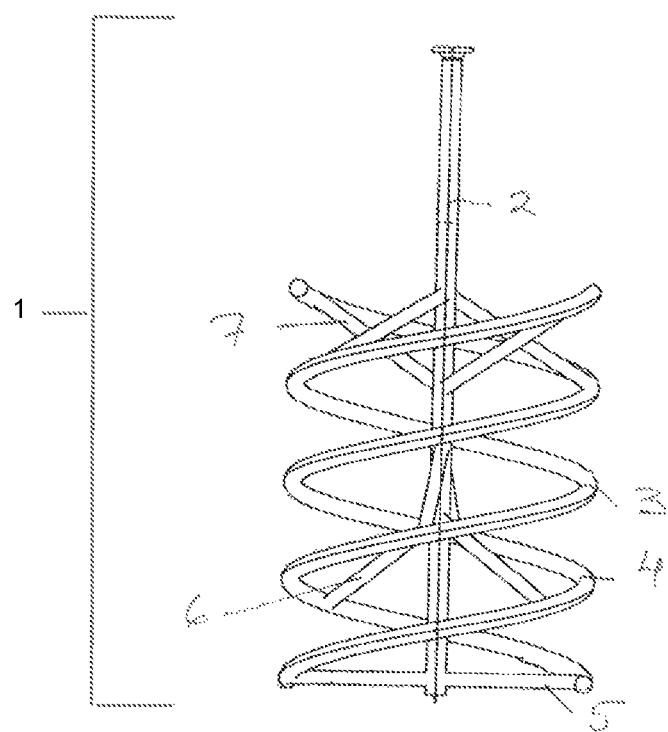
Figure 2A:
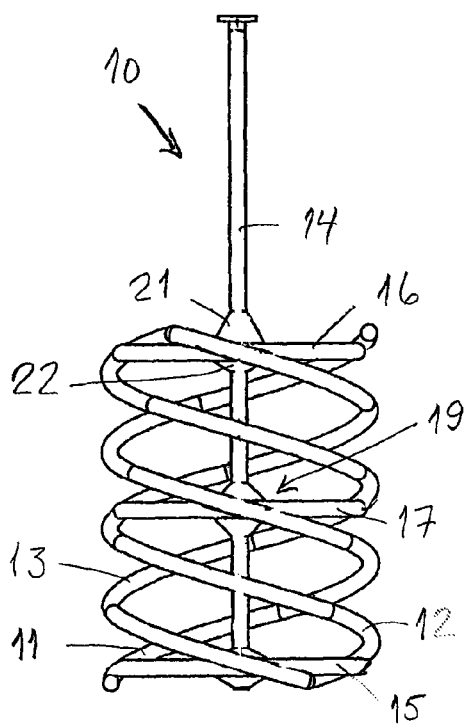
Figure 2B:
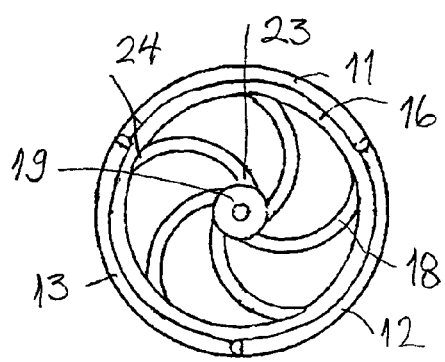
Figure 2C:
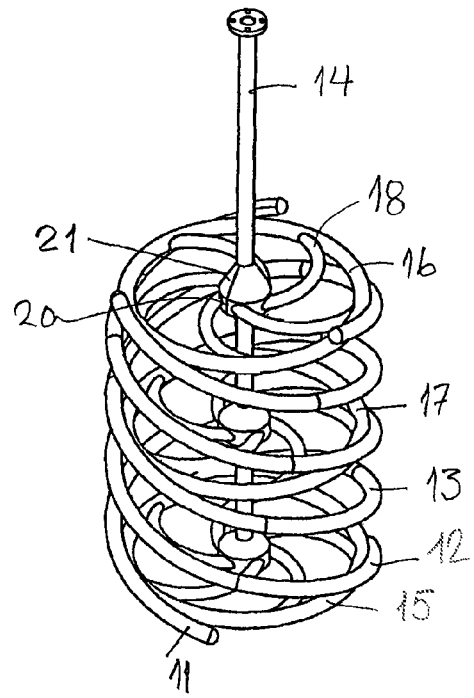
Figure 2D:
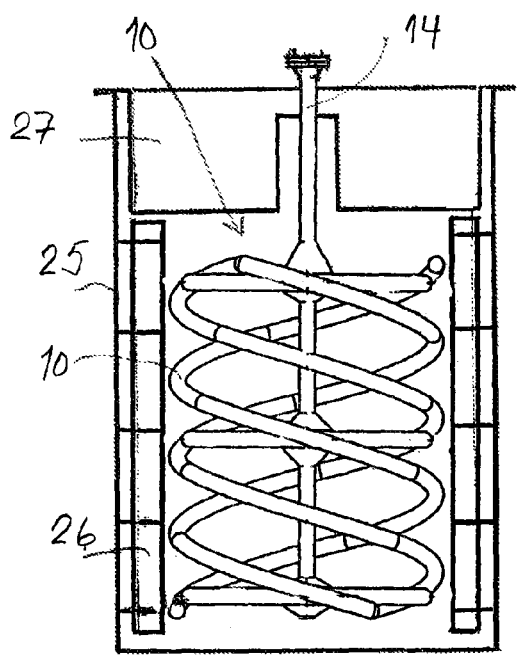
Figure 3:
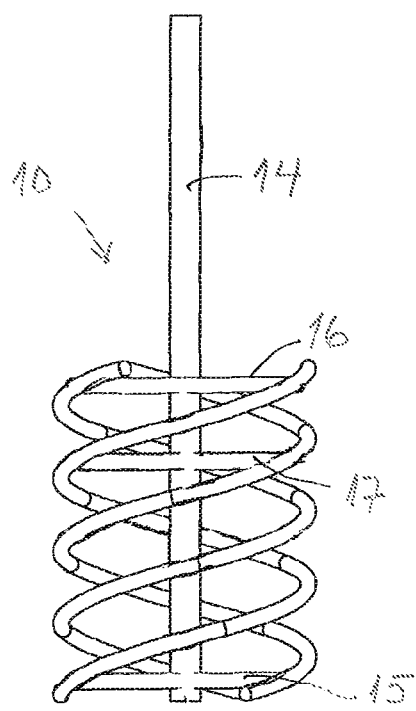
Figure 4:
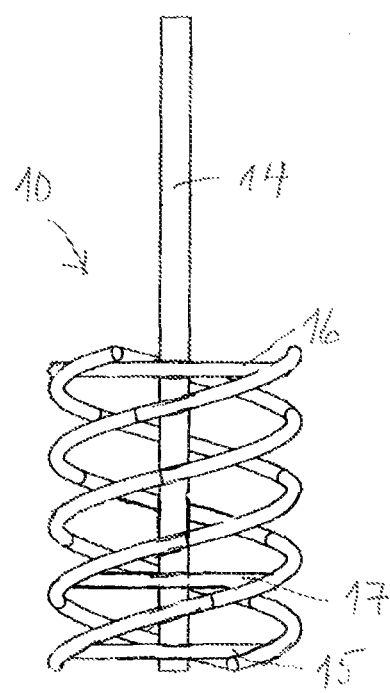
Figures 5A, 5B:
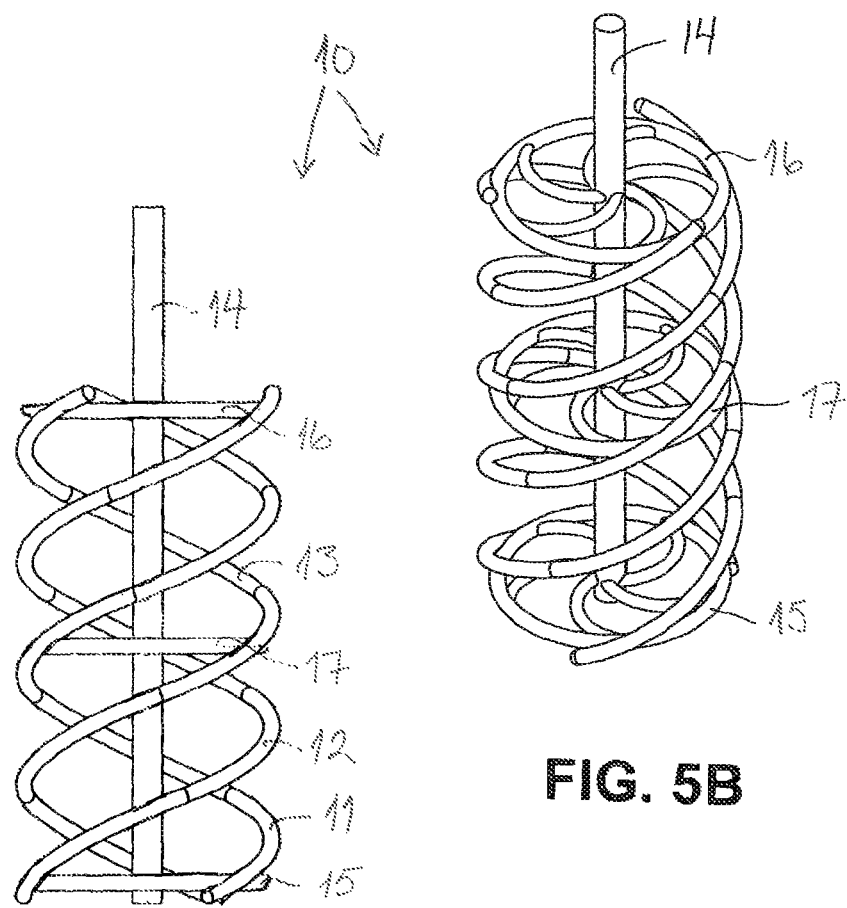
Figure 6:
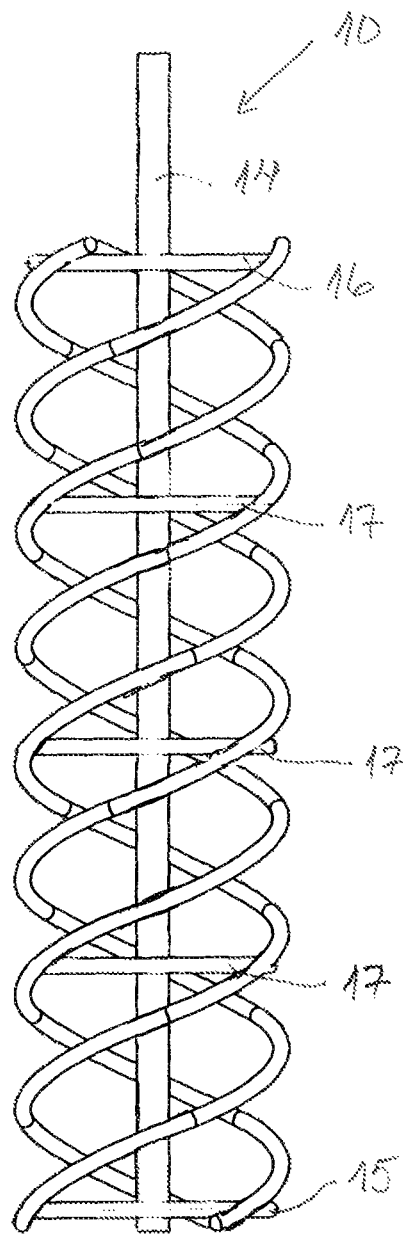
Figure 7:
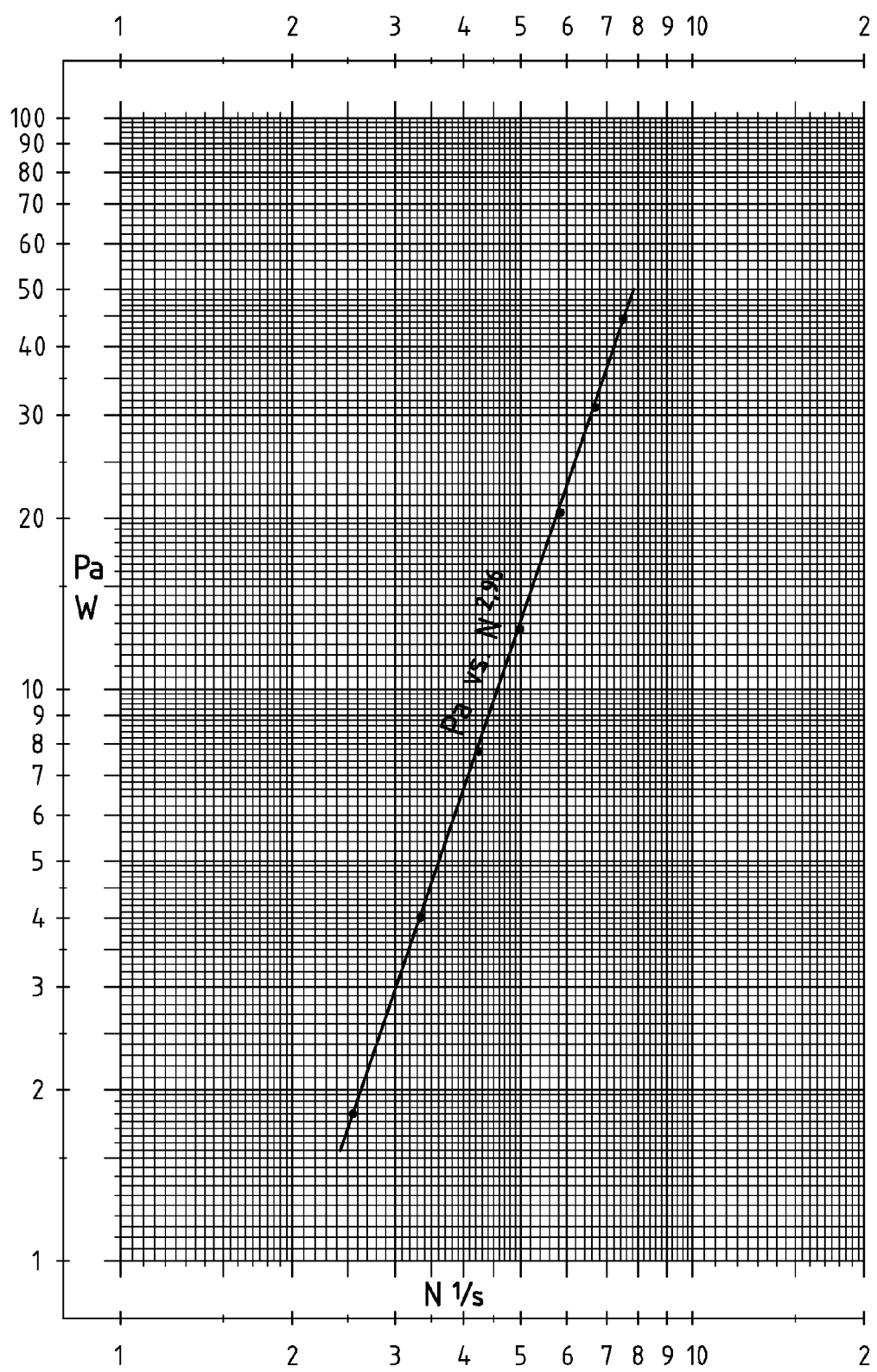
Figure 8:
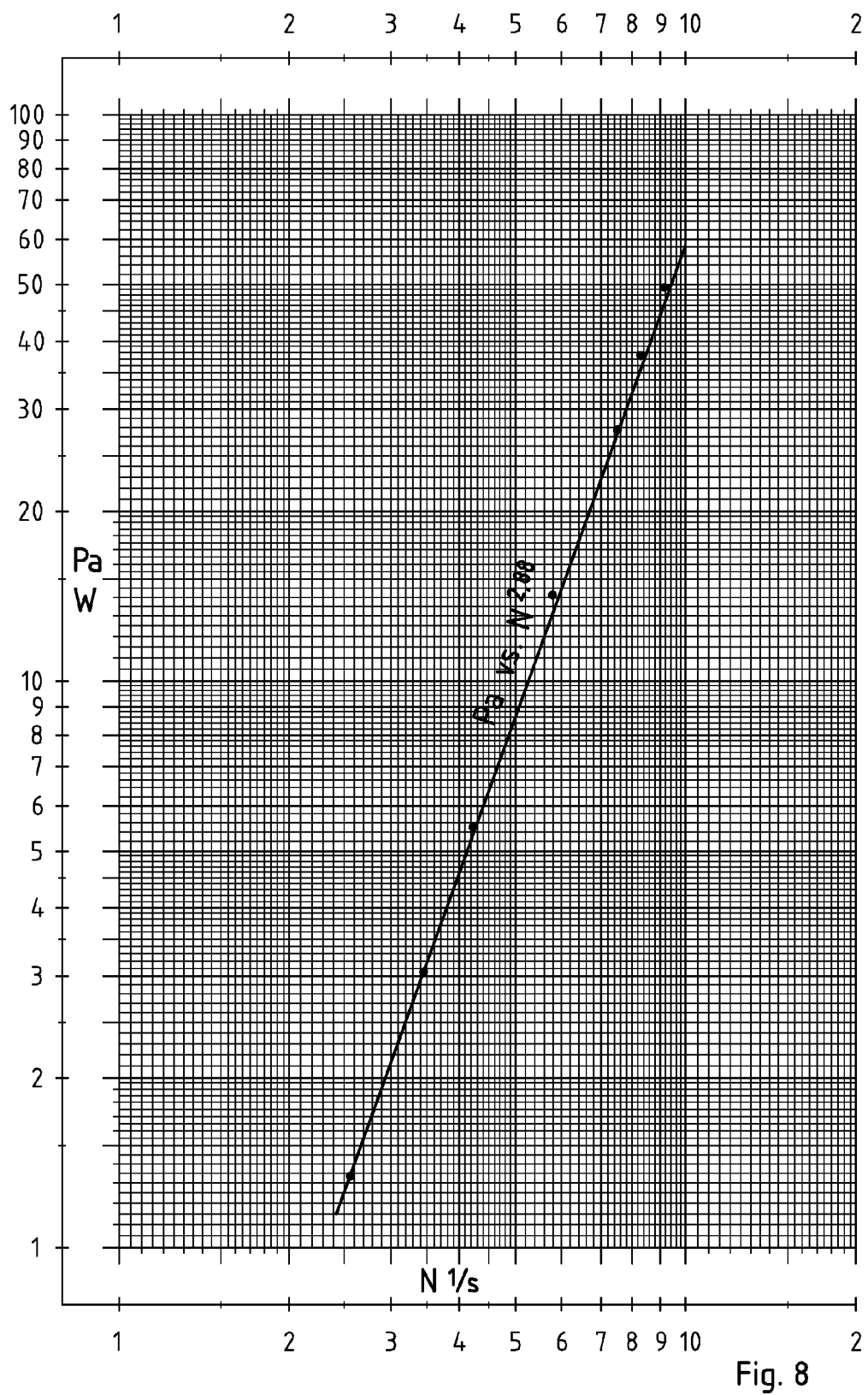
Figure 9:
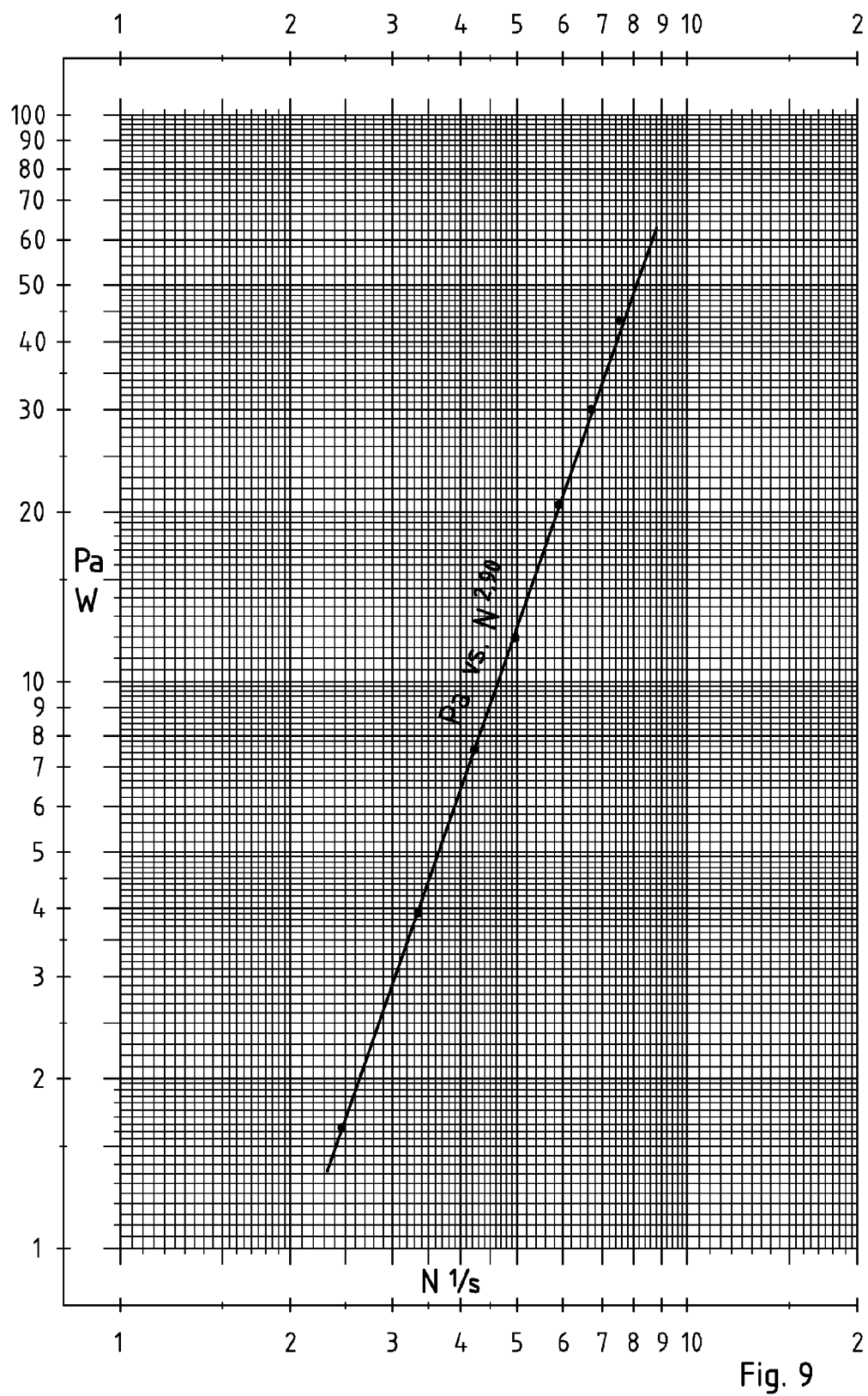

FIG. 1A is a side view of a mixer accordant with the prior art,

FIG. 1B presents a 3D image of a mixer accordant with the prior art,

FIG. 2A is a side view of one mixer accordant with the invention,

FIG. 2B presents the mixer of FIG. 2A as seen from above,

FIG. 2C presents the mixer accordant with FIG. 2A as a 3D image,

FIG. 2D presents the mixer accordant with FIG. 2A located in a solvent extraction mixing space, FIG. 3 is a side view of another embodiment of the invention, FIG. 4 is a side view of a third embodiment of the invention, FIG. 5A is a side view of a fourth embodiment of the invention, FIG. 5B presents a mixer accordant with FIG. 5A as a 3D image, FIG. 6 is a side view of a fifth embodiment of the invention, FIG. 7 is a graphical presentation of shaft power as a function of rotation speed for a mixer accordant with the prior art, FIG. 8 is a graphical presentation of shaft power as a function of rotation speed for a mixer accordant with the invention, and FIG. 9 is a graphical presentation of shaft power as a function of rotation speed for another mixer accordant with the invention.

DETAILED DESCRIPTION OF THE INVENTION

The mixing into a dispersion of two solutions in extraction occurring in the solvent extraction mixing space or mixer in connection with the hydrometallurgical recovery of metals is one of the most important factors for successful extraction. One crucial problem in mixing is too effective mixing, which results in the solutions forming drops, making an emulsion in which the droplet size is so small that separating the solutions from one another in the extraction settling section or settler is unsuccessful or takes an unreasonable amount of time.

A device and method to be used in a solvent extraction mixing space has now been developed in accordance with this invention, which is based purely on the vertical circulation of solutions and the attempt to minimise the radial paths of the solutions in the central section of the mixer. Thus the mixing intensity in the mixer is made very uniform and low throughout the mixer, since the generation of localised eddies is no longer sought. The mixing device and method allow the adjustment of the droplet size distribution of the dispersion to the most favourable range for both the occurrence of mass transfer and solution separation. Uniform mixing also decreases the formation of crud. Since mixing is very uniform without local eddies, the mixing device can be used as the mixing space mixer for even larger extraction cells. Technically it is advantageous to increase the height of the mixing space in relation to its diameter and the mixer accordant with the invention can be adapted for these dimensions. It is also beneficial for the formation of an even-sized dispersion that it can be operated at a low mixer rotation speed, i.e. a maximum of 4 m/s, and still achieve quite a high vertical circulation flow rate, which is about half the mixer rotation speed, in other words in the region of 0.7-1.7 m/s.

The advantage of uniform mixing is that this can be implemented at a lower mixing power than mixing accordant with the prior art, in which some of the power of the mixer is used for radial mixing. Consequently, the power number of the mixer now developed is lower than that of a mixer accordant with the prior art. Another advantage worth mentioning of the mixer now developed is the fact that it enables the formation of a good dispersion of two solvent extraction solutions also in the kind of mixing space whose shape clearly deviates from that presented in the prior art. In a solution accordant with the prior art, the height of the mixing space is more or less the same as its diameter, but with the mixing device accordant with the invention it is possible to achieve a good dispersion also in a mixing space where the ratio of height to diameter is around 1.2-4 and correspondingly the ratio of the mixer height to its diameter is similar.

The lower the surface tension of the liquid-liquid system, the lower the turbulence degree at which the solutions are dispersed. If stripping occurs in an alkaline range, the mixing intensity to be used should be very low, to avoid generating a permanent emulsion. The contamination of solutions in solvent extraction has the effect that, in mixing, the droplet size of a dispersion with a mixing intensity accordant with the prior art easily becomes too small for the separation of the solutions.

It is known earlier that the shaft power of a mixer is calculated according to the following formula:

$P_{shaft} = \psi \, N_p \, \rho \, N^m \, D^5$, where $P_{shaft}$=shaft power [W]

$\psi$=power number correction factor [-], notes for example change in position of mixer $N_p$=power number (specific to mixer) [-]

$\rho$=density of medium to be mixed [kg/m$^3$]

N=rotation speed of mixer [1/s]

m=mixing exponent [-]

D=diameter of mixer [m]

Likewise, it is also known that a flow can be divided into turbulent and laminar flows and the transition range remaining between them, and that the power number of the mixer depends on the Reynolds number in the laminar and transition ranges. The power number in the turbulent zone does not depend on the Re number. The power number $N_p$ is specific to each type of mixer. In a laminar flow the liquid moves non-turbulently and evenly, and in a turbulent flow the liquid swirls and moves without an exact path. It is also known that the mixing exponent in a turbulent flow is 3.

In a solvent extraction mixing section, the mixing intensity does not necessarily have to be in the turbulent range, instead it may also be close to a turbulent flow in the transition range. It was found in the tests carried out that for example the mixing exponent of a mixer accordant with the prior art is in the region of 2.96. The mixing exponent measured for mixing device accordant with the invention is in the region of 2.88, i.e. clearly lower than that measured for a mixer of the prior art, but by modifying the mixer accordant with the invention an exponent value of as little as 2.50 can be approached.

The mixing device accordant with the invention is described in more detail in the attached drawings. FIG. 1A presents a side view of a mixing device 1 accordant with the prior art and 1B a 3D image of it. The mixer accordant with the invention is compared with this mixer above and in the following examples. Mixer 1 comprises two ascending helical tubes 3 and 4 positioned around shaft 2, which tubes are attached to the shaft by means of lower support arms 5, central support arms 6 and upper support arms 7. The lower support arms are radial and the central and upper ones are at an angle to the horizontal, as described above. As also stated above, the helical tubes bring about an ascending flow from the sides of the mixing space and a downward flow on the inner side of the helical tubes. It has also been found that the mixer support arms bring about almost horizontal flows, which have been found harmful when the mixing together of two separate solutions in solvent extraction is concerned.

FIG. 2A shows a side view of one mixer according to the invention, FIG. 2B presents the same mixer as seen from above, FIG. 2C presents the same thing as a 3D image, and FIG. 2D presents the same mixer located in the mixing space of an extraction cell. Mixer 10 consists of at least three helical bars 11, 12, 13, which are located around shaft 14 to ascend from the lower part of the shaft upwards. In order for the flow to be as smooth as possible, the cross-section of the helical bar is preferably circular. Even though the text talks of a helical bar, this term also means a helical tube. The helical bars are connected to the shaft by means of support members, which are made up of support rings and support spokes. The lower ends of the helical bars are supported securely in the lower section of the mixer to lower support ring 15 positioned on the horizontal and the upper ends of the bars correspondingly to upper support ring 16. In addition, the central section of the mixer is also equipped with at least one central section support ring 17. The number of support rings is at least three, but depending on the construction of the mixer there may be 3-6 support rings. In turn, the support rings are connected to the shaft with horizontal curved spokes 18. The support rings like the support spokes are either round bars or tubes, i.e. their profile is essentially circular. The diameter of the support ring is of the same magnitude as that of the helical bar, and the diameter of the support spoke is 0.6-1 times the diameter of the helical bar. At the juncture of the support rings and helical bars a secure join is formed between the outer surface of the support ring and the inner surface of the helical bar, for instance by welding.

The number of helical bars in the mixer is a minimum of three, but the number is preferably between 3 and 5 depending on the size of the mixer and the bars are located symmetrically to rise around the shaft. The pitch angle of the bars is selected to be between 10-30° to the horizontal. In FIG. 2 the angle of pitch is 14.3°. In the case shown in FIGS. 2A and 2C the bars encircle the shaft for one and half rotations, but the number of rotations is selected according to requirements and may be for instance between 1.2 and 3.

The curved spokes 18 of the support rings are horizontal like the support rings and the spokes can be fixed directly to shaft 14 or the fixing point can be equipped with a shaft support structure 19, which consists of a cylindrical section 20, to which the support spokes are fixed, and an upper cone 21 and a lower cone 22 attached to it. The cone sections of the joining point reduce the flow resistance of the joining point, so that the vertical flow pattern brought about by the mixer remains powerful. The joins of the support spokes as well as the joins to both the shaft and the support structure are secure joins, made for example by welding or in some equivalent fashion. The number of support spokes 18 in the drawing is 5, but it may vary as required between for instance 3 and 6. The spokes are curved and they are connected at the first end 23 either to the shaft or the cylindrical section 20 of the shaft support structure at 30-60° and at the second end 24 to the support structure at an angle of 15-30°. The curvature of the support spokes may also be changed if necessary. The direction of curvature of the support spokes is selected to support the vertical circulation of the flow. Accordingly, the direction of curvature of the spokes of upper support ring 16 is set counter to the rotation direction of the mixer and the direction of at least the spokes of the lower support ring are set to accord with the rotation direction of the mixer. Generally, the direction of curvature of the spokes other than those of the upper support ring is also in accord with the direction of rotation of the mixer. As a consequence of the direction of curvature of the spokes, the flow in the lower section of the mixer is laminar and the spokes of the upper support ring cause turbulence.

It is characteristic of the mixing device accordant with the invention that the number of helical bars is at least three, placed symmetrically around the shaft, whereupon the mixing together of the extraction solutions occurs as evenly as possible. Another essential factor is that all the support structures of the helical bars are horizontal and the support spokes are made curved, so that radial flows occurring in the mixing space are minimised. The degree of turbulence in mixing extraction solutions, in other words, intensity, can be controlled for example by changing the number of helical bars and/or changing the angle of pitch, by changing the ratio of the mixer height to its diameter or by changing the curvature of the support spokes.

In FIG. 2D, mixer 10 of FIG. 2A is located in mixing space or mixer 25. The mixing space is equipped with baffles 26 and cover 27. The ratio of the mixer diameter to the diameter of the mixing space is preferably between 0.7-0.77. In turn, the diameter of the helical bars of the mixer is around 0.03-0.07 times the diameter of the mixer. The direction of rotation of the mixer is up-pumping. The ratio of the height of the mixing space to its diameter may vary. In FIG. 2D it is 1.2, but it may be as much as around 4, whereupon either the pitch angle of the helical bars and/or the number of rotations around the shaft is increased.

The mixer according with the invention is located near the bottom of the mixing space so that the bottom clearance is around 0.07-0.11 times the diameter of the mixer. The term surface clearance means the distance between the mixer and the mixing space cover (or liquid surface) and the upper section of the mixer. The surface clearance is preferably double the corresponding bottom clearance, so that the ratio of the height of the mixer to the diameter of the mixing space is of the same magnitude as the ratio of the diameter of the mixer to the diameter of the mixing space or at most 20% greater than this.

FIGS. 3 and 4 present two variations of the mixer accordant with the invention, which illustrate that the location of the central section support ring or support rings 17 in terms of elevation may be changed in accordance with the extraction situation. Thus these variants can be used when it is particularly important to ensure a certain type of dispersion and its continuity for example in the start-up stage of an extraction process. In the structure shown in FIG. 3 the upper and lower support rings of mixer 10 are located in the same way as in FIG. 2A, but central support ring 17 with its spokes is set much higher than the central section of the mixer in terms of elevation. This structure favours generation of the form of dispersion in which the organic solution is continuous and the aqueous solution is as droplets in the organic solution. The structure shown in FIG. 3 is advantageous for instance in a situation where crud has been generated, which should be pushed out of the extraction solution by means of water droplets. In the structure accordant with FIG. 4 centre support ring 17 with its spokes is set much lower than the central section of the mixer in terms of elevation. This structure favours generation of the form of dispersion in which the aqueous solution is continuous and the organic solution as droplets in the aqueous solution. The structure accordant with FIG. 4 can be used for example in a situation where it is advantageous to keep the aqueous solution continuous, even though the ratio of organic solution to aqueous solution (O/A) is over 1 and as high as a value of 3.

FIGS. 5A and 5B present one mixer variation, which is particularly suitable for a mixing space where the height of the mixing space is considerably greater than its diameter, for example in the range of 1.6-2.2. In the example case shown in the drawings, the angle of pitch of the helical bars is around 22°, which is much greater than in the mixer of FIG. 2. The helical bars encircle shaft 14 for one and a half rotations as in FIG. 2.

FIG. 6 presents yet another mixer alternative, in which the ratio of the mixer's height to its diameter may be as much as around 4, and even this is not the absolute upper limit. In this case the ratio of the height of the mixing space to the diameter is also of the same magnitude as that of the mixer. The technically limiting factor is mainly the length of shaft 14. The helical bars of the mixer encircle the shaft for three rotations and their angle of pitch is around 22°. The number of support rings is raised, so that in addition to lower support ring 15 and upper support ring 16, the structure has three support rings 17 located in the central section of the mixer.

The mixing device and method accordant with the invention are further described by means of the examples below.

EXAMPLES

Example 1

The mixer according with the prior art presented in FIG. 1 (FIG. 1, SPIROK for short) was compared with a mixer accordant with the invention (FIG. 2, VSSF for short) using a torque bench as an aid. The study monitored how the power consumption and vertical force of the mixers developed when increasing the number of mixer revolutions. It is known that $$F = N_f \rho N^2 D^4,$$

where
F=induced vertical force on the bottom of the mixing space [N]
$N_f$=hydraulic axial force (characteristic of the mixer) [-]
$\rho$=density of the medium to be mixed [kg/m$^3$]
N=rotational speed of the mixer [1/s]
D=diameter of mixer [m]

The hydraulic axial force $N_f$ describes the vertical force exerted by the mixer on the bottom of the mixing space. It was found in the measurements that the hydraulic axial force of the VSSF mixer was twice that of the SPIROK mixer. This shows that the mixing intensity of the VSSF mixer targets a vertical circulation and the amount of radial flow is smaller than in a SPIROK mixer. The tests were carried out in a tank with a diameter of 245 mm, which was equipped with a flush cover, so that air was prevented from mixing into the solutions. The mixer was equipped with four vertical baffles. The diameter of the mixer was 172 mm and the height 210 mm.

The measurement results of the SPIROK mixer with regard to the shaft power are presented in FIG. 7, which is a graphical presentation of shaft power as a function of rotational speed. The power number $N_p$ calculated from the results was 0.74 when the mixing exponent was 2.96, which is near the exponent value 3 of completely developed turbulence. The vertical force induced by the mixer in the mixing tank was also measured in the torque bench run. The negative shaft power number of −0.12 obtained is an indication of the vertical circulation that the mixer in question brings about.

Corresponding shaft power and vertical force measurements were taken with the VSSF mixer. FIG. 8, which is a graphical presentation of shaft power as a function of rotational speed, shows that the power number $N_p$ was as low as 0.42-0.49 at this point, which indicates that the mixer accordant with the invention creates more vertical circulation and less radial swirling than the SPIROK mixer. The same thing is proved by the measured mixing exponent, which is 2.88 and thus well inside the transition range. Likewise the shaft power number, which is −0.24, shows that the mixing energy is targeted precisely at a vertical circulation. In this way the mixing contact of solution phases in the solvent extraction mixing space and the formation of a dispersion can be implemented at low mixing intensity while the mixing is made homogenous throughout the entire mixing space.

Example 2

The mixing tests accordant with example 1 were made with a VSSF mixer in accordance with the invention, with a height of 322 mm and a diameter of 172 mm. The height of the tank was 390 mm and the diameter 245 mm. The mixer again consisted of three helical bars, which encircled the shaft one and a half times. FIG. 9, which is a graphical presentation of shaft power as a function of rotational speed, shows that the mixing exponent rose to a value of 2.90 and the power number $N_p$ only to a value of 0.64-0.68, which is low in relation to the pitch angle of the helical bars. Power consumption in fact only decreased when taking into account the increase in volume of the mixing space. A mixer where the ratio of height to diameter was increased, strengthened the vertical circulation even more.

The invention claimed is:

1. A mixing device for mixing two solutions in solvent extraction used in the hydrometallurgical recovery of metals in the mixing space of an extraction cell or mixer, characterised in that the mixing device includes at least three helical bars supported around a shaft and rising upwards from the bottom section of the mixing device, whereby the helical bars are fixed to the shaft with support rings placed horizontally and horizontal curved support spokes, where the support spokes are fixed to the shaft at the first end and to a support ring at the second end.

2. A mixing device according to claim 1, characterised in that the angle of pitch of the helical bars is 10-30° to the horizontal.

3. A mixing device according to claim 1, characterised in that the helical bars ascend around the shaft for 1.2-3 revolutions.

4. A mixing device according to claim 1, characterised in that the cross-section of the helical bars, support rings and support spokes is substantially circular.

5. A mixing device according to claim 1, characterised in that there is a secure joint between the outer surface of the support rings and the inner surface of the helical bars.

6. A mixing device according to claim 1, characterised in that the number of the support rings is 3-6, so that the lower end of the helical bars is supported on the lower support ring and the upper end of the helical bars on the upper support ring.

7. A mixing device according to claim 1, characterised in that the number of support rings in the mixing device central section is 1-4 and that their location in terms of elevation can be altered.

8. A mixing device according to claim 1, characterised in that the ratio of the diameter of the mixing device to the diameter of the mixing space is around 0.7-0.77.

9. A mixing device according to claim 1, characterised in that the diameter of the helical bars is 0.03-0.07 times the diameter of the mixing device.

10. A mixing device according to claim 1, characterised in that the ratio of the height of the mixing device to its diameter is around 1.2-4.

11. A mixing device according to claim 1, characterised in that the support spokes are fixed directly to the shaft or by means of a shaft support structure.

12. A mixing device according to claim 11, characterised in that the shaft support structure consists of a cylindrical section, to which the support spokes are fixed and a lower cone connected to the underside of the cylindrical section and an upper cone connected to the upper side.

13. A mixing device according to claim 1, characterised in that the support spokes are fixed at the first end to the shaft at an angle of 30-60° and at the second end to the support ring at an angle of 15-30°.

14. A mixing device according to claim 1, characterised in that the direction of curvature of the support spokes of an upper support ring is set counter to the rotation direction of the mixing device.

15. A mixing device according to claim 1, characterised in that the direction of curvature of at least the support spokes of a lower support ring is set to accord with the rotation direction of the mixing device.

16. A mixer according to claim 1, characterised in that the direction of curvature of the support spokes of a central section support ring of the mixing device is set to accord with the rotation direction of the mixing device.

* * * * *